United States Patent
Chen et al.

(10) Patent No.: US 12,375,187 B2
(45) Date of Patent: Jul. 29, 2025

(54) ADAPTATION OF TRANSMIT AND RECEIVE ANTENNAS

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 18/098,661

(22) Filed: Jan. 18, 2023

(65) Prior Publication Data

US 2023/0155693 A1    May 18, 2023

Related U.S. Application Data

(62) Division of application No. 17/174,324, filed on Feb. 11, 2021, now Pat. No. 11,588,560.

(60) Provisional application No. 62/980,086, filed on Feb. 21, 2020.

(51) Int. Cl.
| | |
|---|---|
| *H04B 15/00* | (2006.01) |
| *H04B 7/06* | (2006.01) |
| *H04B 7/08* | (2006.01) |

(52) U.S. Cl.
CPC ........... *H04B 15/00* (2013.01); *H04B 7/0691* (2013.01); *H04B 7/0874* (2013.01)

(58) Field of Classification Search
CPC ....................................................... H04B 15/00
USPC ........................................................... 375/267
See application file for complete search history.

(56) References Cited

U.S. PATENT DOCUMENTS

| | | | |
|---|---|---|---|
| 10,320,512 B2 * | 6/2019 | Nammi ................. H04J 11/004 |
| 2003/0050086 A1 * | 3/2003 | Lee ..................... H04W 52/267 |
| | | | 370/465 |
| 2007/0076784 A1 | 4/2007 | Zhou et al. |
| 2008/0100510 A1 | 5/2008 | Bonthron et al. |
| 2008/0165797 A1 | 7/2008 | Aceves et al. |
| 2009/0042555 A1 | 2/2009 | Zhu et al. |
| 2011/0151768 A1 | 6/2011 | Snider et al. |
| 2012/0213154 A1 | 8/2012 | Gaal et al. |
| 2013/0051261 A1 | 2/2013 | Kazmi et al. |
| 2014/0146775 A1 * | 5/2014 | Guan .................... H04L 5/0053 |
| | | | 370/329 |
| 2016/0056868 A1 * | 2/2016 | Adachi ............. H04W 52/0206 |
| | | | 370/329 |
| 2018/0054263 A1 | 2/2018 | Manpo et al. |
| 2018/0279231 A1 | 9/2018 | Meng |
| 2020/0178261 A1 * | 6/2020 | Ioffe .................... H04L 1/1812 |
| 2020/0260350 A1 * | 8/2020 | Hong .................... H04W 36/30 |
| 2021/0266076 A1 | 8/2021 | Chen et al. |
| 2021/0297997 A1 | 9/2021 | Hwang et al. |

* cited by examiner

*Primary Examiner* — Lihong Yu
(74) *Attorney, Agent, or Firm* — QUALCOMM IP DEPT.; James Hunt Yancey, Jr.

(57) ABSTRACT

An antenna adaptation is provided for a communication node as controlled by an antenna adaptation command. The antenna adaptation command adjusts the number of active transmit antennas and/or the number of active receive antennas in the communication node such as for reducing interference at the communication node.

5 Claims, 7 Drawing Sheets

ADAPTATION OF TRANSMIT AND RECEIVE ANTENNAS

CROSS REFERENCE TO RELATED APPLICATIONS

The present application is a divisional of U.S. application Ser. No. 17/174,324, filed Feb. 11, 2021, which in turns claims the benefit of U.S. Provisional Patent Application No. 62/980,086, filed Feb. 21, 2020, the contents of both of which are hereby incorporated by reference in their entirety.

TECHNICAL FIELD

The technology discussed below relates generally to wireless communication systems, and more particularly, to a time-period-based antenna adaptation for wireless communication.

INTRODUCTION

In a fifth generation (5G) new radio (NR) access network, bandwidth part (BWP) uplink (UL) layer adaptation may be used to achieve different number of layers in different BWPs. For example, during a period of relatively-high data rate transmission, a user equipment (UE) may be switched to a larger BWP with more layers. But such a relatively large BWP and layer usage consumes power. The UE may thus be switched to a smaller BWP with fewer layers during periods of relatively-low data rate transmission. In addition to BWP adaptation, a UE may be adapted to fallback from transmit (T) and receive (R) antenna configurations such as from two transmit antennas and four receive antennas (2T4R) to one transmit antenna and two receive antenna (1T2R). Although these adaptations save power, a UE may be subjected to substantial same-link interference or cross-link interference during downlink (DL) reception. Improved UE adaptations are thus needed to combat such interferences.

SUMMARY

The following presents a simplified summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In accordance with a first aspect of the disclosure, a method of wireless communication for a node is provided that includes: receiving an antenna adaptation command at the node; determining a combination of at least one transmit antenna and at least one receive antenna from a plurality of antenna combinations responsive to the antenna adaptation command, wherein the antenna adaptation command is valid for an antenna adaptation period; and communicating at the node using the determined combination of the at least one transmit antenna and the at least one receive antenna.

In accordance with a second aspect of the disclosure, a method of wireless communication for a node is provided that includes: during a first antenna adaptation period, transmitting from the node over a transmit set of transmit antennas according to a first data rate and receiving at the node over a receive set of antennas; selecting a subset of the transmit antennas in the transmit set responsive to an antenna adaptation command; and during a second antenna adaptation period, transmitting from the node over the subset of transmit antennas according to a second data rate that is lower than the first data rate.

In accordance with a third aspect of the disclosure, a communication node is provided that includes: a set of antennas; a processor configured to process a first antenna adaptation command that is valid for a first antenna adaptation period to determine a first subset of transmit antennas from the set of antennas and to determine a first subset of receive antennas from the set of antennas; and a transceiver configured to communicate using the first subset of transmit antennas and the first subset of receive antennas during the first antenna adaptation period.

In accordance with a fourth aspect of the disclosure, a wireless communication method for a base station is provided that includes: commanding a user equipment to use a first transmit and receive antenna selection during a first antenna adaptation period; and commanding the user equipment to use a second transmit and receive antenna selection during a second antenna adaptation period to reduce an interference at the user equipment during the second antenna adaptation period.

These and other aspects of the disclosure will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
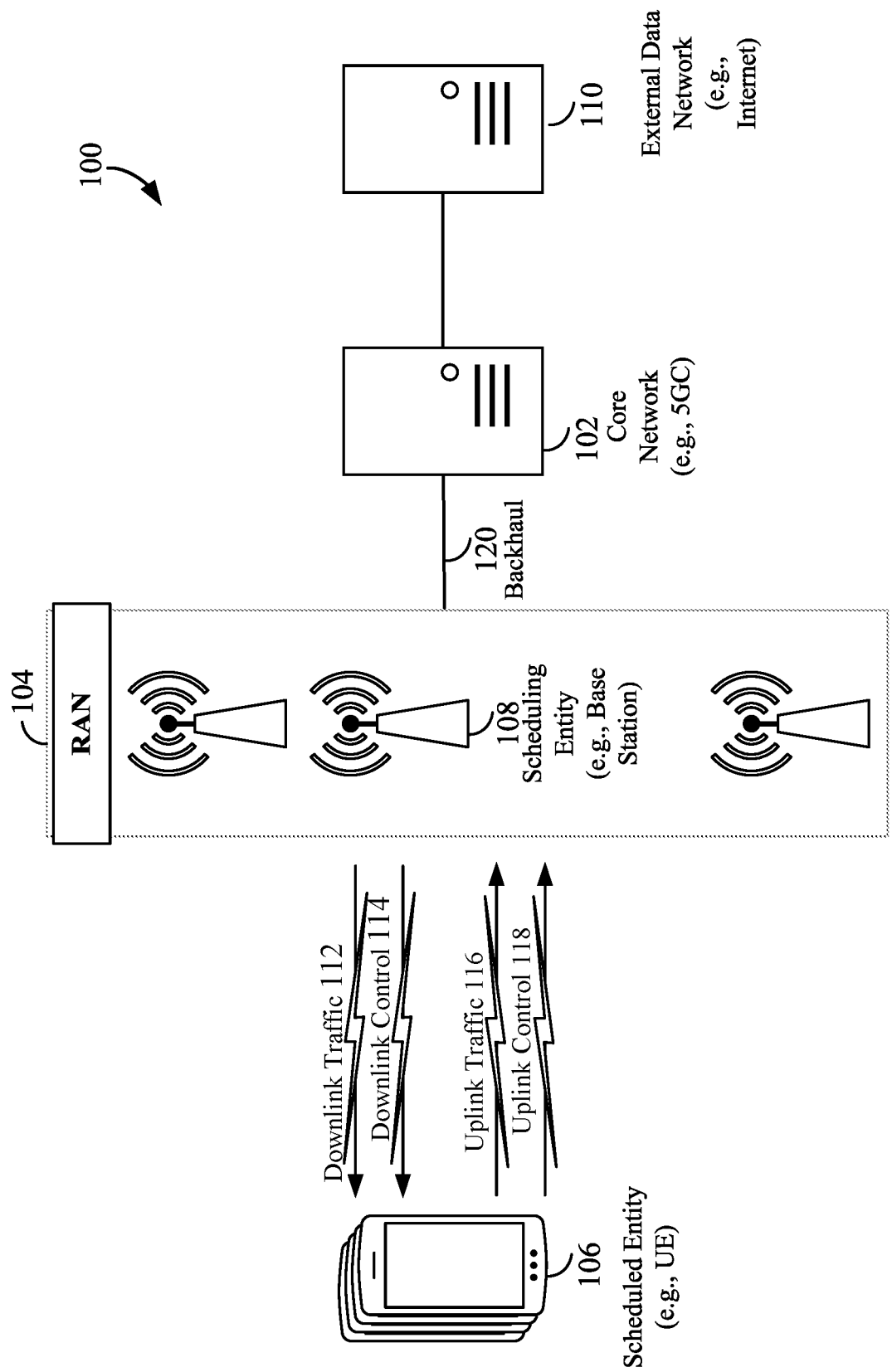
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Definitions

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Generally refers to 5G technologies and the new radio access technology undergoing definition and standardization by 3GPP in Release 15.

Beamforming: directional signal transmission or reception. For a beamformed transmission, the amplitude and phase of each antenna in an array of antennas may be precoded, or controlled to create a desired (e.g., directional) pattern of constructive and destructive interference in the wave front.

MIMO: multiple-input multiple-output. MIMO is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another.

1. In single-user MIMO, the transmitter sends one or more streams to the same receiver, taking advantage of capacity gains associated with using multiple Tx, Rx antennas in rich scattering environments where channel variations can be tracked.
2. The receiver may track these channel variations and provide corresponding feedback to the transmitter. This feedback may include channel quality information (CQI), the number of preferred data streams (e.g., rate control, a rank indicator (RI)), and a precoding matrix index (PMI).

Massive MIMO: a MIMO system with a very large number of antennas (e.g., greater than an 8×8 array).

MU-MIMO: a multi-antenna technology where base station, in communication with a large number of UEs, can exploit multipath signal propagation to increase overall network capacity by increasing throughput and spectral efficiency, and reducing the required transmission energy.

3. The transmitter may attempt to increase the capacity by transmitting to multiple users using its multiple transmit antennas at the same time, and also using the same allocated time—frequency resources. The receiver may transmit feedback including a quantized version of the channel so that the transmitter can schedule the receivers with good channel separation. The transmitted data is precoded to maximize throughput for users and minimize inter-user interference.

DCI: downlink control indicator. A set of information transmitted at the L1 Layer that, among other things, schedules the downlink data channel (e.g., PDSCH) or the uplink data channel (e.g., PUSCH).

MAC-CE: media access control-control element. A MAC structure used for carrying MAC layer control information between a gNB and a UE. The structure may be implemented as a special bit string in a logical channel ID (LCD) field of a MAC Header.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
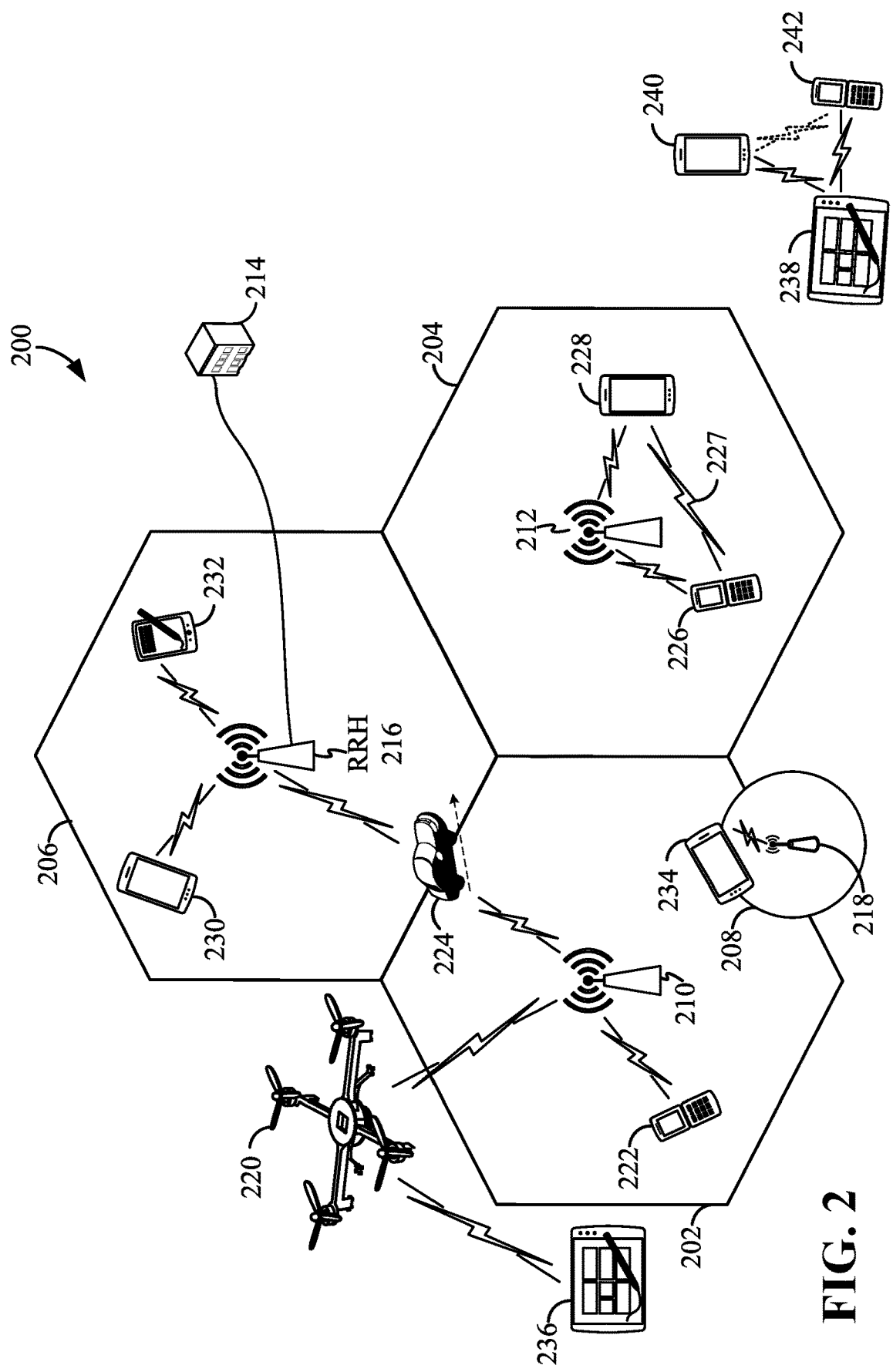
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time—frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
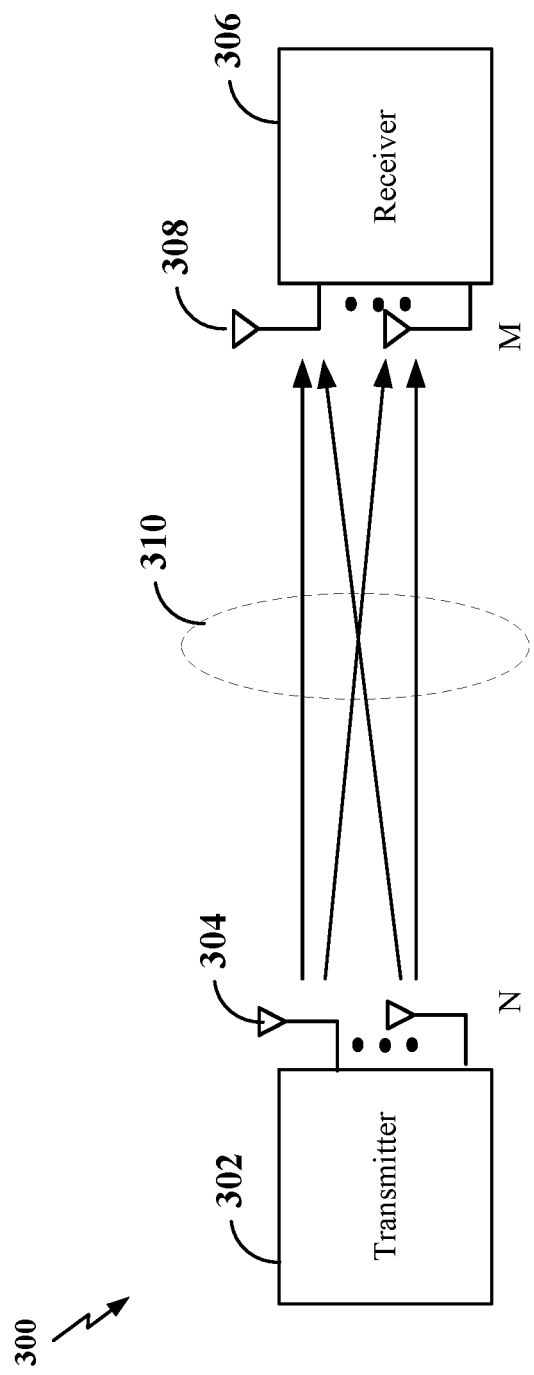
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feedback the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. An expanded view of an exemplary DL subframe 402 is also illustrated in FIG. 4, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time— frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device). A set of contiguous RBs 408 such as shown for resource grid 404 form a bandwidth part (BWP).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
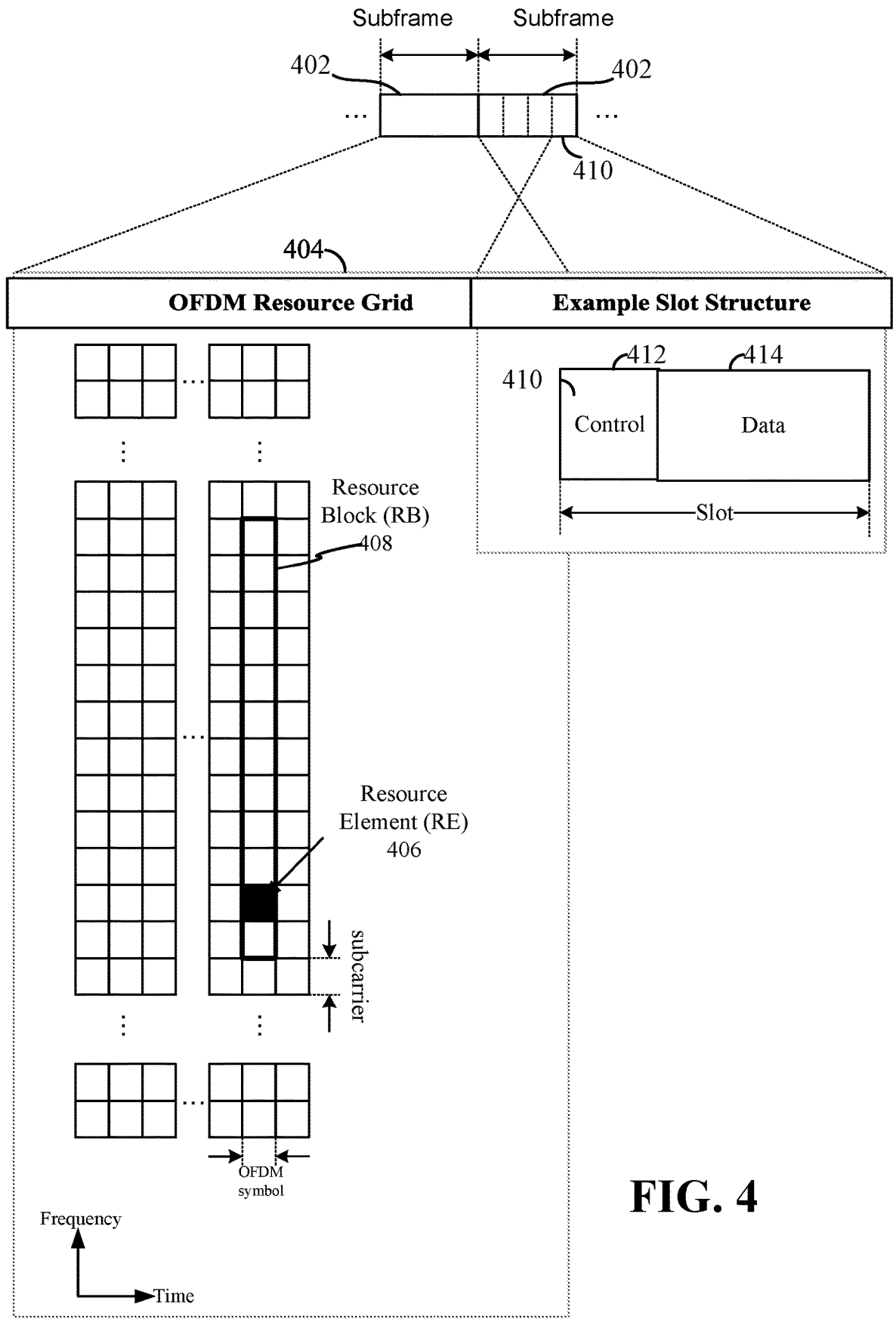
FIG. 4 is a schematic illustration of an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TB S), which may correspond to a number of bits of information, may be a controlled parameter, based on the modulation and coding scheme (MCS) and the number of RBs in a given transmission.

Exemplary Implementations

As previously noted, interference such as same-link interference and cross-link interference remain as impediments to DL reception for a UE. Same-link interference refers to interference stemming from other UEs in the same cell (intra-cell) or from neighboring cells (inter-cell). Cross-link interference occurs during full-duplex operation in which the UE's transmit antennas and receive antennas operate simultaneously (same-cell). Inter-cell cross-link interference may occur to a UE operating on a carrier frequency if transmission occurs in neighboring cells in different UL/DL slot configurations but on the same carrier or neighboring carriers.

To combat these sources of interference, it is useful for a communication node (e.g., a UE) to use a relatively-smaller number of transmit antennas for UL and a relatively-larger number of receive antennas for DL. But note that the sources of interference may be time dependent. For example, referring again to FIG. 4, the UL and DL traffic may change from one sub-frame 402 to another sub-frame 402. Alternatively, this traffic may change on a slot 410 to another slot 410 basis. Indeed, the sources of interference may change on a sub-slot (mini time slot) basis. A scheduling entity such as any of base stations 210, 212, 214, 218 of FIG. 2 as disclosed herein may adapt the number of transmit antennas to be used for UL as well as the number of receive antennas to be used for DL. This adaptation is responsive to an antenna adaptation command that is valid for an antenna adaptation period. Depending upon the implementation, the antenna adaptation period may be a time slot, a portion of a time slot such as a mini slot, a plurality of time slots, or a bandwidth part switching period.

Note that the UE itself (or a neighboring UE) may be the scheduling entity in alternative implementations. In general, it will be assumed herein that the UE possesses a plurality of antennas (e.g., 2, 4, or more) for such scheduling. In a TDD implementation, the plurality of antennas may be shared for both transmit and receive. In a full-duplex implementation, there may instead be a set of transmit antennas and a distinct set of receive antennas.

Once a UE has begun to camp in the corresponding cell supported by a gNB, it may be assumed herein that the gNB is then informed of the number of transmit and receive antennas available to the UE so that the antenna selection may be based upon the UE's particular configuration. Similarly, the gNB is informed of the number of antenna ports as well as the RF chains available in the UE so that MIMO data streams (layers) may be adapted as well. In addition, the UE's antenna switching capability should also be considered. Dependent upon these factors, the antenna adaptation command controls the selection or determination of which transmit antennas will be used for UL during the antenna adaptation period. Similarly, the antenna adaptation command (or commands) controls which receive antennas will be used for DL during the antenna adaptation period. The antenna adaptation command may have a variety of implementations. In one implementation, the scheduling information discussed earlier for the DCI carried in the PDCCH may include one or more bits to form the antenna adaptation command that controls the antenna adaptations. For example, one DCI bit indication may control an adaptation between a single transmit antenna, two receive antenna (1T2R) configuration for the UE and a single transmit antenna, four receive antenna (1T4R) configuration for the UE. Alternatively, the antenna adaptation command may be based on at least one of the DCI format, the decoding candidate, and the DCI size.

In another implementation, the antenna adaptation command may be based upon at least one MAC-CE message. In yet another implementation, the antenna adaptation command may be an RRC-based command that is configured individually to the UE and is active during a time period such as corresponding to a bandwidth part switching period, to a time slot, or to a portion of a time slot such as a mini-slot. Note that all these examples of an adaptation command may be activation/deactivation based such that once the transmit and receive antenna assignment is fixed by the adaptation command it will be valid until de-activated or re-activated. The resulting activation may thus be indefinite or semi-persistent. Such an activation command may be formed using any combination of the preceding DCI, MAC CE, or RRC implementations.

Should a UE be implementing carrier aggregation, the antenna adaptation responsive to the antenna adaptation command may be the same as or differ across the various component carriers (CCs) included within the carrier aggregation. For example, the antenna adaptation for a first component carrier may be independent from or tied to the antenna adaptation for a second component carrier. Similarly, the antenna adaptation for a first component carrier may be controlled by an antenna adaptation command transmitted on a second component carrier. In addition, if the UE is subjected to fallback, the fallback may be managed separately or jointly for different antenna adaptation states. For example, operation in a 2T4R configuration or a 1T4R configuration may both fallback to a 1T2R configuration. Alternatively, operation in different antenna configurations may be subjected to different fallback states.

More generally, the antenna configuration responsive to an antenna adaptation command may be denoted as xTyR, where x represents the number of selected transmit (T) antennas and y represents the number of selected receive (R) antennas. Some example xTyR configurations include 1T2R, 1T4R, 2T4R, 4T4R, 1T8R, 2T8R, 4T8R, 8T8R, and so on. Such xTyR configurations are also denoted herein as antenna combinations as each xTyR configuration may be deemed to represent a particular combination of transmit and receive antennas. The antenna adaptation command thus identifies or determines a particular antenna combination for the communication node. The communication node may then proceed to communicate using the determined antenna combination (transmit using the selected transmit antennas and receive using the selected receive antennas).

The antenna adaptation may be based on the bandwidth part adaptation to offer a more refined management as compared to layer adaptation. For example, selection of a first antenna configuration such as 1T4R may be based on a first bandwidth part switching period (BWP1). The bandwidth part adaptation is thus linked to the antenna configuration in such an implementation. Similarly, selection of a second antenna configuration (e.g., 1T2R) may be based on operation in a second bandwidth part switching period (BWP2) whereas selection of a third antenna configuration (e.g., 2T4R) may be based on operation in a third bandwidth part switching period (BWP3), and so on.

The antenna adaptation as disclosed herein may also be exclusive such that a UE is instructed by the antenna adaptation command to exclude certain ones of coupled receive and transmit antennas. For example, a UE may be commanded to use only standalone (dedicated) receive antennas for reception and/or to use only standalone transmit antennas for transmission.

Figure 5:
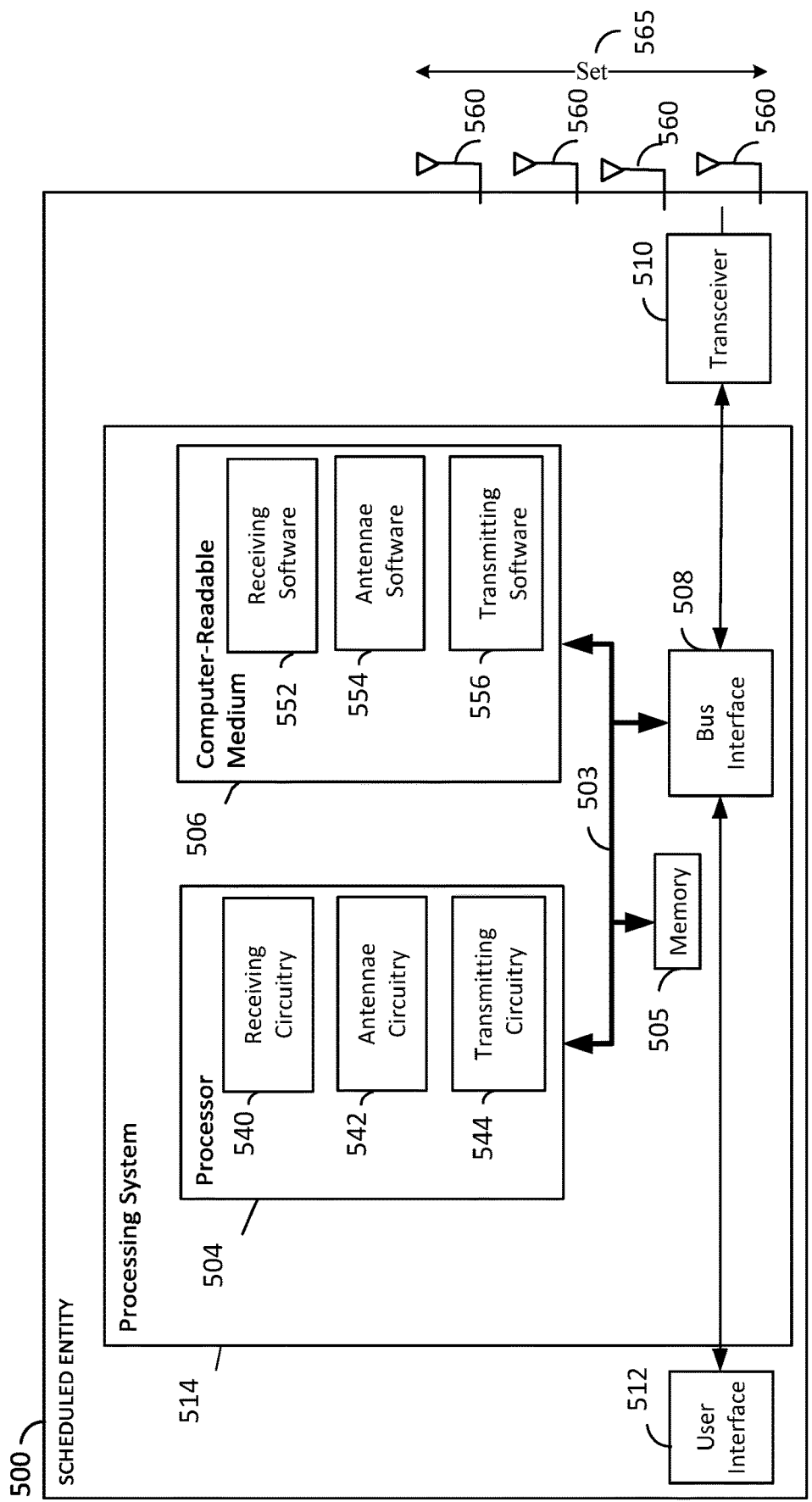
FIG. 5 is a block diagram illustrating an example of a hardware implementation for a scheduled entity employing a processing system in accordance with aspects disclosed herein.

An example UE (scheduled entity) 500 is shown in FIG. 5 that includes a processing system 514 for controlling the transmit and receive selections from a set 565 of antennas 560. It is assumed herein that there are at least four antennas 560. Processing system 514 includes a bus interface 508, a bus 502, memory 505, a processor 504, and a computer-readable medium 506. Furthermore, UE 500 may include a user interface 512 and a transceiver 510.

The processor 504 may include a receiving circuitry 50 configured for various functions, including, for example, to receive the antenna adaptation command. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. As illustrated, the processor 504 may also include antennae circuitry 542 configured for various functions. For instance, antennae circuitry 542 may be configured to configure at least four antennas 560 responsive to the antenna adaptation command. The processor 504 may further include transmitting circuitry 544 configured for various functions, including, for example, to transmit an antenna status indication regarding the number of antennas 560 for UE 500.

Various other aspects for UE 500 are also contemplated. For instance, it is contemplated that the transmitting circuitry 544 may be configured to report to the network a UE capability. Such UE capability may, for example, encompass the capabilities of the at least four antennas 560, which includes the capability of the UE 500 to support antenna selection. For example, UE 500 may have the capability to operate in a 1T4R configuration, a 1T2R configuration, and a 2T4R configuration as described previously. Other possible configurations include 1T1R (one transmit antenna and one receive antenna), 4T4R (four transmit antennas and four receive antennas), and 2T2R (two transmit antennas and four receive antennas). As noted earlier, the antenna configuration may be denoted as xTyR, where x represents the number of selected transmit antennas and y represents the number of selected receive antennas. It will be appreciated that x and y may be greater than four depending (e.g., eight or sixteen) depending upon the antenna array size for UE 500. It will be further appreciated that transceiver 510 includes antenna switching circuits (not illustrated) for the selection of the active receive and transmit antennas. If the antenna adaptation is within a single bandwidth part switching period and is slot-dependent, the channel state information (CSI) feedback from UE 500 may be configured accordingly. For example, slot-dependent CSI may be designed assuming the corresponding xTyR antenna configuration. Transmission of an uplink sounding reference signal (SRS) may also be dependent on the antenna adaptation in some implementations. In addition, xTyR adaptation may be dependent on the type of transmissions from UE 500. For example, some transmissions such as groupcast and broadcast transmissions, or unicast transmissions as scheduled by fallback downlink control information (DCI) may all use a particular or reference xTyR antenna configuration. In such implementations, the xTyR adaptation may only be possible for non-fallback DCI.

Processor 504 is also responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

The bus 502 may include any number of interconnecting buses and bridges depending on the specific application of the processing system 514 and the overall design constraints. The bus 502 communicatively couples together various circuits including one or more processors (represented generally by the processor 504), the memory 505, and computer-readable media (represented generally by the computer-readable medium 506). The bus 502 may also link various other circuits such as timing sources, peripherals, voltage regulators, and power management circuits, which are well known in the art, and therefore, will not be described any further. The bus interface 508 provides an interface between the bus 502 and the transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 506, which may be a non-transitory computer-readable medium. The computer-readable medium 506 may reside in the processing system 514, external to the processing system 514, or distributed across multiple entities including the processing system 514.

In one or more examples, the computer-readable storage medium 506 may include receiving software 552 configured for various functions, including those performed by receiving circuitry 540. Similarly, antennae software 554 may be configured with the instructions for antennae circuitry 542 and transmitting software 556 may be configured with the instructions for transmitting circuitry 544.

In a particular configuration, it is also contemplated that the UE 500 includes means for receiving an antenna adaptation command and means for configuring antennas of the UE 500 based on the antenna adaptation command. In one aspect, the aforementioned means may be the processor(s) 504 configured to perform the functions recited by the aforementioned means. In another aspect, the aforementioned means may be a circuit or any apparatus configured to perform the functions recited by the aforementioned means.

Figure 6:
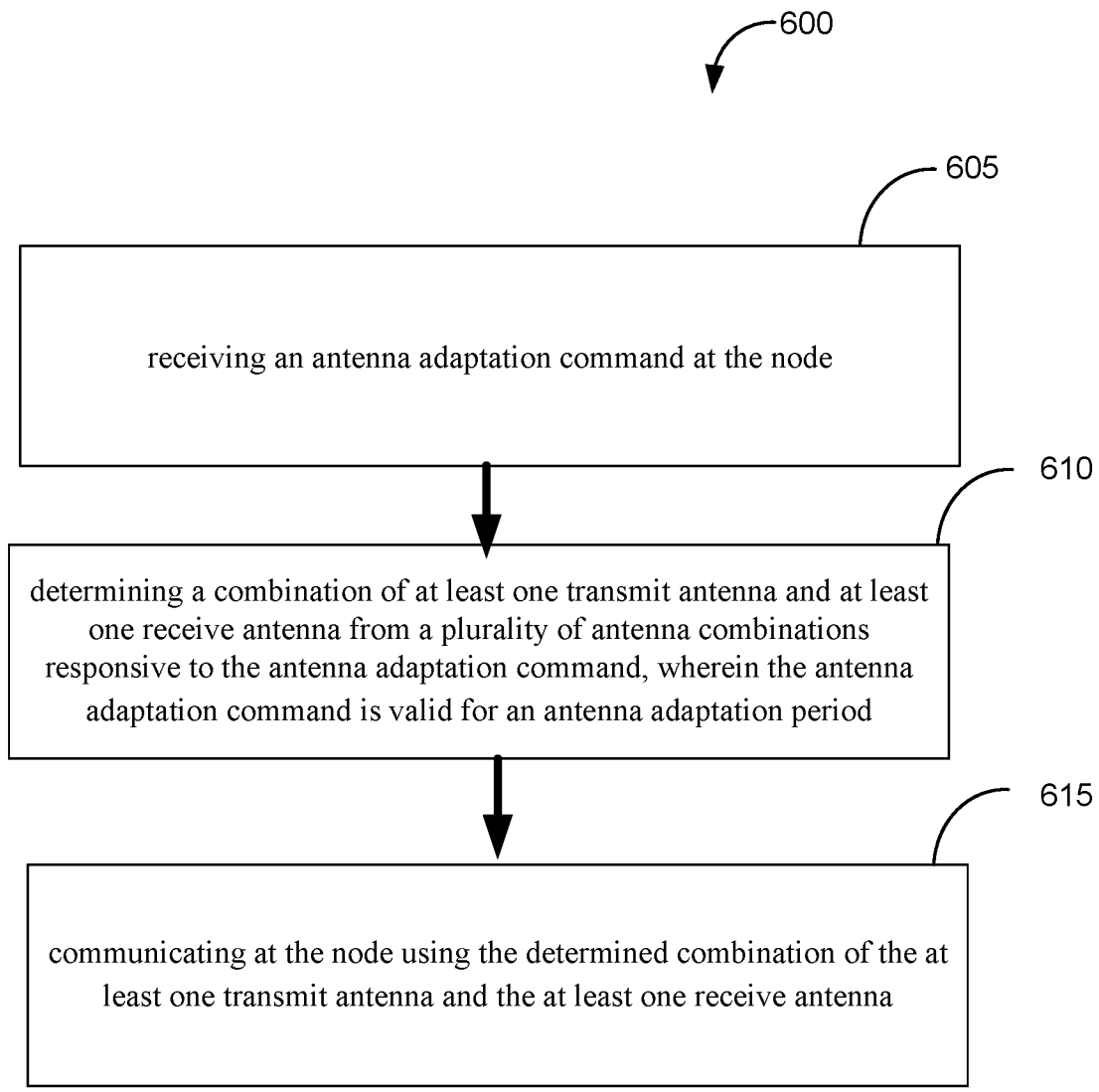
FIG. 6 is a flow chart illustrating an exemplary antenna adaptation process that facilitates some aspects of the disclosure.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described herein, and utilizing, for example, the processes and/or algorithms described in relation to FIG. 6. In FIG. 6, a flow chart is provided, which illustrates an exemplary antenna adaptation process 600 for wireless communication at a node. In some examples, the node at which process 600 may be carried out may be the UE 500 illustrated in FIG. 5. In some examples, the node may be a base station such as discussed further with regard to FIG. 7 below.

Process 600 begins with an act 605 of receiving an antenna adaptation command at the node. As noted earlier, the antenna adaptation command may be implemented in a variety of ways such as through a DCI message, a MAC CE, or an RLC-based message. The process 600 also includes an act 610 of determining a combination of at least one transmit antenna and at least one receive antenna from a plurality of antenna combinations responsive to the antenna adaptation command, wherein the antenna adaptation command is valid for an antenna adaptation period. The selection of x transmit antennas and y receive antennas for an xTyR antenna configuration is an example of act 610. In addition, the process includes an act 615 of communicating at the node using the determined combination of the at least one transmit antenna and the at least one receive antenna. This communication may be either an uplink message or a downlink message and may also be either a user plane message or a control plane message.

Figure 7:
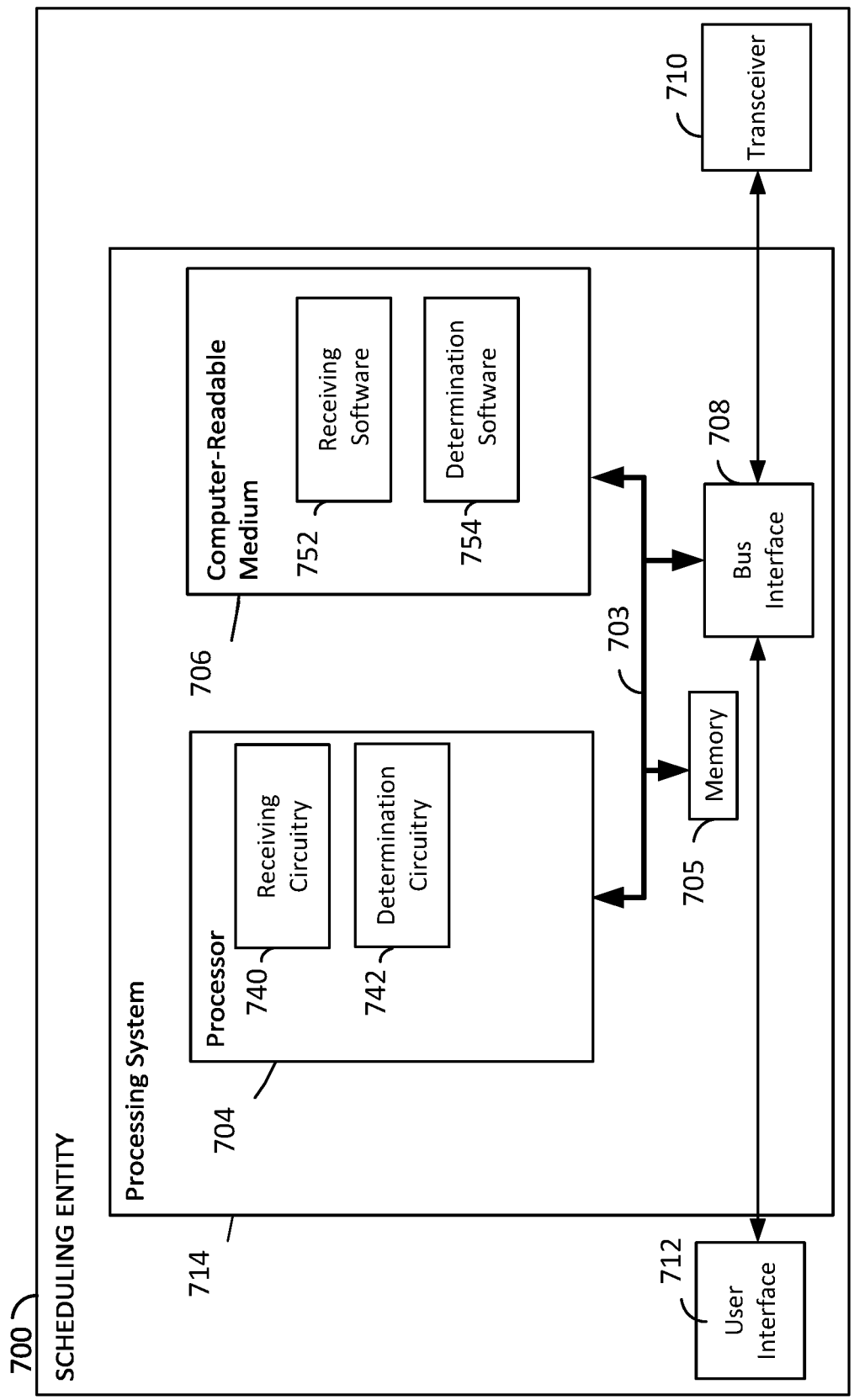
FIG. 7 is a block diagram illustrating an example of a hardware implementation for a scheduling entity employing a processing system in accordance with aspects disclosed herein.

FIG. 7 is a block diagram illustrating an example of a hardware implementation for a scheduling entity such as a base station 700 employing a processing system 714. In alternative implementations, the scheduling entity may be another UE. Processing system 714 includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 700 may be configured to perform any one or more of the functions described herein.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided.

In some aspects of the disclosure, the processor 704 may include a receiving circuitry 740 configured for various functions, including, for example, to receive an antenna configuration capability reported from a scheduled entity (e.g., UE 500), wherein the scheduled entity comprises at least four antennas. As illustrated, the processor 704 may also include a determination circuitry 742 configured for various functions. For instance, the determination circuitry 742 may be configured to perform an antenna selection determination based on the capability reporting and to generate a corresponding antenna adaptation command accordingly. An example antenna adaptation command may command for a xTyR antenna configuration in the scheduled entity (e.g., UE 500)

Referring back to the remaining components of base station 700, it should be appreciated that the processor 704 is responsible for managing the bus 702 and general processing, including the execution of software stored on the computer-readable medium 706. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 706, which may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer.

In one or more examples, the computer-readable storage medium 706 may include receiving software 752 including the instructions for receiving circuitry 740. As illustrated, the computer-readable storage medium 706 may also include determination software 754 including the instructions for determination circuitry 742.

It will be appreciated that the antenna adaptation discussed herein may also be practiced by a scheduling entity such as base station 700. Such adaptation in base station 700 may be transparent to any specification or protocol such that the adaptation would also be transparent to any UEs. Alternatively, the base station adaptation may impact the specification such that at least the transmit antenna selection for base station 700 would be indicated to the UE or UEs served by base station 700.

The disclosure will now be summarized in the following example clauses:

Clause 1. A method of wireless communication for a node, comprising:
  receiving an antenna adaptation command at the node;
  determining a combination of at least one transmit antenna and at least one receive antenna from a plurality of antenna combinations responsive to the antenna adaptation command, wherein the antenna adaptation command is valid for an antenna adaptation period; and communicating at the node using the determined combination of the at least one transmit antenna and the at least one receive antenna.

Clause 2. The method of clause 1, wherein the node is a user equipment (UE).

Clause 3. The method of clause 1, wherein the node is a base station.

Clause 4. The method of any of clauses 1-3, wherein the plurality of antenna combinations includes at least two of a 1T2R, 1T4R, 2T4R, 4T4R, 1T8R, 2T8R, 4T8R, and 8T8R transmit (T) and receive (R) antenna combinations.

Clause 5. The method of any of clauses 1-4, wherein the antenna adaptation period is a time slot.

Clause 6. The method of any of clauses 1-4, wherein the antenna adaptation period is a plurality of time slots.

Clause 7. The method of any of clauses 1-4, wherein the antenna adaptation period is a bandwidth part switching period.

Clause 8. The method of any of clauses 1-4, wherein the antenna adaptation period is a mini time slot.

Clause 9. The method of any of clauses 1-8, wherein the antenna adaptation command is based on a downlink control information (DCI) message.

Clause 10. The method of clause 9, wherein the DCI message is a plurality of DCI messages having at least a first DCI format in a first time instance and having a second DCI format in a second time instance, and wherein the antenna adaptation command is a first antenna adaptation command, the method further comprising:
  determining the first antenna adaptation command based on the first DCI format in the first time instance; and
  determining a second antenna adaptation command based on the second DCI format in the second time instance.

Clause 11. The method of clause 10, wherein each DCI message in the plurality of DCI messages differs in a least one of a DCI decoding candidate and a DCI size.

Clause 12. The method of any of clauses 1-8, wherein the antenna adaptation command is based on a media access control (MAC) control element (CE) message.

Clause 13. The method of any of clauses 1-8, wherein the antenna adaptation command is based on a radio-resource-control-based message.

Clause 14. The method of any of clauses 1-13, wherein the antenna adaptation command is for a first component carrier, and wherein the communicating at the node is over a second component carrier.

Clause 15. The method of any of clauses 1-14, wherein a fallback antenna configuration for the node is dependent upon the determined combination of the at least one transmit antenna and the at least one receive antenna.

Clause 16. The method of any of clauses 1-14, wherein a fallback antenna configuration for the node is independent of the determined combination of the at least one transmit antenna and the at least one receive antenna.

Clause 17. The method of any of clauses 1-16, wherein the communicating at the node is a full-duplex communication, and wherein the at least one transmit antenna is not associated with any receive antenna.

Clause 18. The method of clause 2, further comprising:
  determining a channel state information (CSI) feedback based on the determined combination of the at least one transmit antenna and the at least one receive antenna; and
  reporting the CSI feedback from the UE to a base station.

Clause 19. The method of clause 2, further comprising:
  determining a sounding reference signal (SRS) configuration based on the determined combination of the at least one transmit antenna and the at least one receive antenna; and
  transmitting an SRS based on the determined SRS configuration from the UE to a base station.

Clause 20. A method of wireless communication for a node, comprising:
  during a first antenna adaptation period, transmitting from the node over a transmit set of transmit antennas according to a first data rate and receiving at the node over a receive set of antennas;
  selecting a subset of the transmit antennas in the transmit set responsive to an antenna adaptation command; and
  during a second antenna adaptation period, transmitting from the node over the subset of transmit antennas according to a second data rate that is lower than the first data rate.

Clause 21. The method of clause 20, wherein the antenna adaptation command is based upon at least one of a DCI message, a MAC CE message, and an RRC message.

Clause 22. The method of any of clauses 20-21, wherein the first antenna adaptation period is a first time slot and the second antenna adaptation period is a second time slot, and wherein the transmitting during the first time slot uses a transmit (T) and a receive (R) antenna configuration selected from a plurality of antenna configurations including a 1T2R configuration, a 1T4R configuration, a 2T4R configuration, a 4T4R configuration, a 1T8R configuration, a 2T8R configuration, a 4T8R configuration, and an 8T8R configuration.

Clause 23. The method of any of clause 20-22, wherein the antenna adaptation command is for at least one component carrier, and wherein the transmitting from the node during the second time slot is over the one component carrier.

Clause 24. A communication node, comprising:
   a set of antennas;
   a processor configured to process a first antenna adaptation command that is valid for a first antenna adaptation period to determine a first subset of transmit antennas from the set of antennas and to determine a first subset of receive antennas from the set of antennas; and
   a transceiver configured to communicate using the first subset of transmit antennas and the first subset of receive antennas during the first antenna adaptation period.

Clause 25. The communication node of clause 24, wherein the communication node is a user equipment (UE).

Clause 26. The communication node of clause 24, wherein the communication node is a base station.

Clause 27. The communication node of clause 26, wherein the processor is further configured to command the transceiver to transmit a message to a user equipment to identify to the user equipment that the base station is configured with the first subset of transmit antennas.

Clause 28. A wireless communication method for a base station, comprising:
   commanding a user equipment to use a first transmit and receive antenna selection during a first antenna adaptation period; and
   commanding the user equipment to use a second transmit and receive antenna selection during a second antenna adaptation period to reduce an interference at the user equipment during the second antenna adaptation period.

Clause 29. The wireless communication method of clause 28, wherein the first transmit and receive antenna selection and the second transmit and receive antenna selection are both a transmit (T) and a receive (R) antenna configuration selected from a plurality of antenna configurations including a 1T2R configuration, a 1T4R configuration, a 2T4R configuration, a 4T4R configuration, a1T8R configuration, a2T8R configuration, a4T8R configuration, and an 8T8R configuration.

Clause 30. The wireless communication method of any of clauses 28-29, wherein the first antenna adaptation period is a first bandwidth part switching period and the second antenna adaptation period is a second bandwidth part switching period.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-7 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-7 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication for a user equipment, comprising:
during a first antenna adaptation period, transmitting from the user equipment over a first number of transmit antennas according to a first data rate and receiving over a second number of receive antennas;
transitioning from the first antenna adaptation period to a second antenna adaptation period responsive to an antenna adaptation command to address interference to downlink reception at the user equipment, wherein the antenna adaptation command comprises at least one of a downlink control information (DCI) message, a media access control (MAC) control element (CE) message, and a radio resource control (RRC) message, and wherein the first antenna adaptation period and the second antenna adaptation period comprise one of a time slot, a portion of a time slot, a plurality of time slots, and a bandwidth part switching period; and
during the second antenna adaptation period, transmitting from the user equipment over a third number of transmit antennas according to a second data rate that is lower than the first data rate and receiving over a fourth number of receive antennas, wherein the first number of transmit antennas is greater than the third number of transmit antennas, and wherein the fourth number of receive antennas is greater than the second number of receive antennas.

2. The method of claim 1, wherein the antenna adaptation command is based upon the DCI message, and wherein the DCI message comprises a plurality of DCI messages having a first DCI format in a first time instance and having a second DCI format in a second time instance, and wherein the antenna adaptation command comprises a first antenna adaptation command, the method further comprising:
determining the first antenna adaptation command based on the first DCI format in the first time instance; and
determining a second antenna adaptation command based on the second DCI format in the second time instance.

3. The method of claim 2, wherein each DCI message in the plurality of DCI messages differs in at least one of a DCI decoding candidate and a DCI size.

4. The method of claim 2, wherein the first antenna adaptation period is a first time slot and the second antenna adaptation period is a second time slot, and wherein the transmitting and receiving during the first time slot uses a transmit (T) and a receive (R) antenna configuration selected from a plurality of antenna configurations including a 1T2R configuration, a 1T4R configuration, a 2T4R configuration, a 4T4R configuration, a 1T8R configuration, a 2T8R configuration, a 4T8R configuration, and an 8T8R configuration.

5. A user equipment, comprising:
a set of transmit antennas;
a set of receive antennas;
a processor configured to process an antenna adaptation command to select a first number of transmit antennas from the set of transmit antennas and a second number of receive antennas from the set of receive antennas to address interference to downlink reception at the user equipment, wherein the antenna adaptation command comprises at least one of a downlink control information (DCI) message, a media access control (MAC) control element (CE) message, and a radio resource control (RRC) message; and
a transceiver configured to transmit at a first data rate through a second number of transmit antennas from the set of transmit antennas during a first antenna adaptation period and to receive over a third number of receive antennas from the set of receive antennas, the transceiver being further configured to transmit at a second data rate through the first number of transmit antennas during a second antenna adaptation period and to receive over the second number of receive antennas, wherein the first data rate is greater than the second data rate, the second number of receive antennas is larger than the third number of receive antennas, the first number of transmit antennas is less than the second number of transmit antennas, and the first antenna adaptation period and second antenna adaptation period each comprise one of a time slot, a portion of a time slot, a plurality of time slots, and a bandwidth part switching period.

* * * * *